US009862836B2

(12) United States Patent
Yoshino et al.

(10) Patent No.: US 9,862,836 B2
(45) Date of Patent: Jan. 9, 2018

(54) THERMOSETTING POWDER COATING MATERIAL AND COATED ARTICLE

(71) Applicant: FUJI XEROX CO., LTD., Tokyo (JP)

(72) Inventors: Susumu Yoshino, Kanagawa (JP); Takahiro Ishizuka, Kanagawa (JP); Takeshi Agata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 264 days.

(21) Appl. No.: 14/532,261

(22) Filed: Nov. 4, 2014

(65) Prior Publication Data

US 2015/0368477 A1 Dec. 24, 2015

(30) Foreign Application Priority Data

Jun. 20, 2014 (JP) ................ 2014-127411

(51) Int. Cl.
*C09D 5/03* (2006.01)
*C09D 133/14* (2006.01)
*C08K 5/098* (2006.01)
*C09D 167/02* (2006.01)
*C09D 4/00* (2006.01)
*C09D 7/12* (2006.01)
*C08F 220/06* (2006.01)
*C08F 220/18* (2006.01)
*C08F 220/32* (2006.01)

(52) U.S. Cl.
CPC .............. *C09D 5/031* (2013.01); *C08K 5/098* (2013.01); *C09D 4/00* (2013.01); *C09D 7/1266* (2013.01); *C09D 7/1275* (2013.01); *C09D 133/14* (2013.01); *C09D 167/02* (2013.01); *C08F 220/06* (2013.01); *C08F 220/18* (2013.01); *C08F 2220/325* (2013.01); *Y10T 428/264* (2015.01)

(58) Field of Classification Search
CPC ........................................ C09D 5/00–167/02
See application file for complete search history.

(56) References Cited

U.S. PATENT DOCUMENTS

| | | | |
|---|---|---|---|
| 3,998,768 A * | 12/1976 | Pettit, Jr. ............ | C08G 18/4063 524/311 |
| 5,811,190 A | 9/1998 | Laas et al. | |
| 6,008,301 A | 12/1999 | Miyawaki et al. | |
| 7,285,303 B2 * | 10/2007 | Martin ................ | C09D 5/031 427/2.14 |
| 2002/0086104 A1 | 7/2002 | Yabuta et al. | |
| 2005/0165133 A1 | 7/2005 | Sacripante et al. | |
| 2006/0062929 A1 * | 3/2006 | Kittle ................ | B05C 19/025 427/475 |
| 2008/0064850 A1 | 3/2008 | Kawaguchi et al. | |
| 2009/0253827 A1 * | 10/2009 | Mukai .................. | C08J 3/126 523/201 |

FOREIGN PATENT DOCUMENTS

| | | |
|---|---|---|
| CN | 101155859 A | 4/2008 |
| JP | S51-042731 A | 4/1976 |
| JP | S56-18660 A | 2/1981 |
| JP | H08-92505 A | 4/1996 |
| JP | H08-512077 A | 12/1996 |
| JP | H09-227800 A | 9/1997 |
| JP | H10-72557 A | 3/1998 |
| JP | H10-204332 A | 8/1998 |
| JP | H11-209653 A | 8/1999 |
| JP | H11-302568 A | 11/1999 |
| JP | 2001-106959 A | 4/2001 |
| JP | 2001-294806 A | 10/2001 |
| JP | 3262276 B2 | 3/2002 |
| JP | 2002-212499 A | 7/2002 |
| JP | 2002212497 A * | 7/2002 |
| JP | 2003-082273 A | 3/2003 |
| JP | 2004-210875 A | 7/2004 |
| JP | 2005-211900 A | 8/2005 |
| JP | 2005-343982 A | 12/2005 |
| JP | 2006-111853 A | 4/2006 |
| JP | 2006-152059 A | 6/2006 |
| JP | 2008-174636 A | 7/2008 |
| JP | 2013-155266 A | 8/2013 |
| WO | 95/01406 A1 | 1/1995 |

OTHER PUBLICATIONS

Machine translation JP 2002-212497 (2002).*
Nov. 4, 2015 Office Action issued in Japanese Patent Application No. 2014-127411.
Mar. 29, 2016 Office Action issued in Japanese Patent Application No. 2014-127411.
Feb. 20, 2017 Office Action issued in Chinese Patent Application No. 201410743334.8.
Apr. 18, 2017 Office Action issued in Japanese Patent Application No. 2016-107079.

* cited by examiner

*Primary Examiner* — Alexandre F Ferre
(74) *Attorney, Agent, or Firm* — Oliff PLC

(57) ABSTRACT

A thermosetting powder coating material includes a thermosetting resin, a thermosetting agent, and metal salt containing an alkyl group having 5 to 20 carbon atoms.

20 Claims, No Drawings

THERMOSETTING POWDER COATING MATERIAL AND COATED ARTICLE

CROSS-REFERENCE TO RELATED APPLICATIONS

This application is based on and claims priority under 35 USC 119 from Japanese Patent Application No. 2014-127411 filed Jun. 20, 2014.

BACKGROUND

1. Technical Field

The present invention relates to a thermosetting powder coating material and a coated article.

2. Related Art

In recent years, since a small amount of volatile organic compounds (VOC) is discharged in a coating step and a powder coating material which is not attached to a material to be coated can be collected and reused after the coating, a powder coating technology using a powder coating material is given attention from the viewpoint of a global environment. Accordingly, various powder coating materials are being investigated.

SUMMARY

According to an aspect of the invention, there is provided a thermosetting powder coating material including: a thermosetting resin; a thermosetting agent; and metal salt containing an alkyl group having 5 to 20 carbon atoms.

DETAILED DESCRIPTION

Hereinafter, exemplary embodiments of a thermosetting powder coating material, a manufacturing method thereof, a coated article, and a manufacturing method thereof of the present invention will be described in detail.

Thermosetting Powder Coating Material and Manufacturing Method of the Same

A thermosetting powder coating material according to the exemplary embodiment (hereinafter, also referred to as a "powder coating material") contains a thermosetting resin, a thermosetting agent, and metal salt containing an aliphatic group having 5 to 20 carbon atoms.

The powder coating material according to the exemplary embodiment may be any of a transparent powder coating material (clear coating material) not containing a colorant in the powder particles, and a colored powder coating material containing a colorant in the powder particles.

In the case of coating a surface to be coated using the powder coating material by a spray method, a charge is applied to the powder by a triboelectric method or a corona method, the powder coating material is attached to the surface to be coated using an electric field, and the surface to be coated is coated with the powder coating material. In this case, applying the charge between powder particles as evenly as possible leads to an increase in coating efficiency. For example, the powder particles not holding the charge or holding a slight amount of the charge have a weak electrostatic force, and accordingly the powder coating material may not be attached to the material to be coated. Thus, in the powder of the related art, the coating efficiency may be low due to the comparatively uneven charge.

When the powder coating material according to the exemplary embodiment is used, the coating efficiency is improved. The reason thereof is not clear, but is considered to be as follows.

Since the powder coating material according to the exemplary embodiment contains metal salt containing an aliphatic group having 5 to 20 carbon atoms, the surface of the particles of the powder coating material easily holds the charge when the metal salt exists thereon. Accordingly, a percentage of the powder particles not holding the charge or holding a slight amount of the charge decreases. As a result, it is considered that, the charge is more evenly held between the powder particles and the coating efficiency is improved.

Hereinafter, the powder coating material according to the exemplary embodiment will be described in detail.

The powder coating material according to the exemplary embodiment contains the powder particles. The powder coating material may contain an external additive, if necessary, in order to improve fluidity.

Powder Particles

A structure of the powder particles contained in the powder coating material according to the exemplary embodiment is not particularly limited. The powder particles preferably have a structure of including a core and a resin coating portion for coating a surface of the core, in order to prevent exposure of a pigment which may be contained in the powder particles and will be described later, to the surface of the powder particles. That is, the powder particles preferably have a core/shell structure.

Property of Powder Particles

The volume average particle size distribution index GSDv of the powder particles is preferably equal to or less than 1.50, more preferably equal to or less than 1.40, and even more preferably equal to or less than 1.30, from the viewpoints of smoothness of a coating film and storage properties of the powder coating material.

The volume average particle diameter D50v of the powder particles is preferably from 1 μm to 25 μm, more preferably from 2 μm to 20 μm, and even more preferably from 3 μm to 15 μm, in order to form a coating film having high smoothness with a small amount of the coating material.

The average circularity of the powder particles is preferably equal to or greater than 0.96, more preferably equal to or greater than 0.97, and even more preferably equal to or greater than 0.98, from the viewpoints of smoothness of the coating film and the storage properties of the powder coating material.

Herein, the volume average particle diameter D50v and the volume average particle size distribution index GSDv of the powder particles are measured with a Coulter Multisizer II (manufactured by Beckman Coulter, Inc.) and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkylbenzene sulfonate) as a dispersing agent. The obtained material is added to 100 ml to 150 ml of the electrolyte.

The electrolyte in which the sample is suspended is subjected to a dispersion treatment using an ultrasonic disperser for 1 minute, and a particle size distribution of particles having a particle diameter of 2 μm to 60 μm is measured by a Coulter Multisizer II using an aperture having an aperture diameter of 100 μm. 50,000 particles are sampled.

Cumulative distributions by volume are drawn from the side of the smallest diameter with respect to particle size ranges (channels) separated based on the measured particle size distribution. The particle diameter when the cumulative percentage becomes 16% is defined as that corresponding to a volume particle diameter D16v, while the particle diameter when the cumulative percentage becomes 50% is defined as that corresponding to a volume average particle diameter D50v. Furthermore, the particle diameter when the cumulative percentage becomes 84% is defined as that corresponding to a volume particle diameter D84v.

A volume average particle size distribution index (GSDv) is calculated as $(D84v/D16v)^{1/2}$.

The average circularity of the powder particles is measured by using a flow type particle image analyzer "FPIA-3000 (manufactured by Sysmex Corporation)". Specifically, 0.1 ml to 0.5 ml of a surfactant (alkyl benzene sulfonate) as a dispersant is added into 100 ml to 150 ml of water obtained by removing impurities which are solid matter in advance, and 0.1 g to 0.5 g of a measurement sample is further added thereto. A suspension in which the measurement sample is dispersed is subjected to a dispersion process with an ultrasonic dispersion device for 1 minute to 3 minutes, and concentration of the dispersion is from 3,000/µl to 10,000/µl. Regarding this dispersion, the average circularity of the powder particles is measured by using the flow type particle image analyzer.

Herein, the average circularity of the powder particles is a value obtained by acquiring a circularity (Ci) of each of n particles measured for the powder particles and then calculated by the following equation. However, in the following equation, Ci represents a circularity (=circumference length of a circle equivalent to a projected area of the particle/circumference length of a particle projection image), and fi represents frequency of the powder particles.

$$\text{Average circularity }(Ca) = \left(\sum_{i=1}^{n}(Ci \times fi)\right) \bigg/ \sum_{i=1}^{n}(fi) \quad \text{Expression 1}$$

Core

The powder particles contained in the powder coating material according to the exemplary embodiment contain a thermosetting resin, a thermosetting agent, and metal salt containing an aliphatic group having 5 to 20 carbon atoms. When the powder particles have a structure including a core and a resin coating portion coating a surface of the core, the core may contain a thermosetting resin, a thermosetting agent, and metal salt containing an aliphatic group having 5 to 20 carbon atoms. The core may contain other additives such as a colorant, if necessary.

Thermosetting Resin

The thermosetting resin is a resin including a thermosetting reaction group. In the related art, as the thermosetting resin, various types of resin used in the powder particles of the powder coating material are used.

The thermosetting resin may be a water-insoluble (hydrophobic) resin. When the water-insoluble (hydrophobic) resin is used as the thermosetting resin, environmental dependence upon a charging property of the powder coating material (powder particle) is decreased. When preparing the powder particle by an aggregation and coalescence method, the thermosetting resin is preferably a water-insoluble (hydrophobic) resin, in order to realize emulsification and dispersion in an aqueous medium. The water-insolubility (hydrophobicity) means that a dissolved amount of a target material with respect to 100 parts by weight of water at 25° C. is less than 5 parts by weight.

Among the thermosetting resins, at least one kind selected from the group consisting of a thermosetting (meth)acrylic resin and a thermosetting polyester resin is preferable. In the exemplary embodiment, (meth)acryl means acryl or methacryl, and a (meth)acryloyl group means an acryloyl group or a methacryloyl group.

Thermosetting (Meth)Acrylic Resin

The thermosetting (meth)acrylic resin is a (meth)acrylic resin including a thermosetting reaction group. For the introduction of the thermosetting reaction group to the thermosetting (meth)acrylic resin, a vinyl monomer including a thermosetting reaction group may be used. The vinyl monomer including a thermosetting reaction group may be a (meth)acrylic monomer (monomer including a (meth)acryloyl group), or may be a vinyl monomer other than the (meth)acrylic monomer.

Examples of the thermosetting reaction group of the thermosetting (meth)acrylic resin include an epoxy group, a carboxylic group, a hydroxyl group, an amide group, an amino group, an acid anhydride group, a (block) isocyanate group, and the like. Among these, as the thermosetting reaction group of the (meth)acrylic resin, at least one kind selected from the group consisting of an epoxy group, a carboxylic group, and a hydroxyl group is preferable, from the viewpoint of ease of preparation of the (meth)acrylic resin. Particularly, from the viewpoints of excellent storage stability of the powder coating material and coating film appearance, at least one kind of the thermosetting reaction group is more preferably an epoxy group.

Examples of the vinyl monomer including an epoxy group as the thermosetting reaction group include various chain epoxy group-containing monomers (for example, glycidyl (meth)acrylate, β-methyl glycidyl (meth)acrylate, glycidyl vinyl ether, and allyl glycidyl ether), various (2-oxo-1,3-oxolane) group-containing vinyl monomers (for example, (2-oxo-1,3-oxolane) methyl (meth)acrylate), various alicyclic epoxy group-containing vinyl monomers (for example, 3,4-epoxy cyclohexyl (meth)acrylate, 3,4-epoxycyclohexylmethyl (meth)acrylate, and 3,4-epoxycyclohexylethyl (meth)acrylate), and the like.

Examples of the vinyl monomer including a carboxylic group as the thermosetting reaction group include various carboxylic group-containing monomers (for example, (meth)acrylic acid, crotonic acid, itaconic acid, maleic acid, and fumaric acid), various monoesters of α,β-unsaturated dicarboxylic acid and monohydric alcohol having 1 to 18 carbon atoms (for example, monomethyl fumarate, monoethyl fumarate, monobutyl fumarate, monoisobutyl fumarate, monotert-butyl fumarate, monohexyl fumarate, monooctyl fumarate, mono2-ethylhexyl fumarate, monomethyl maleate, monoethyl maleate, monobutyl maleate, monoisobutyl maleate, monotert-butyl maleate, monohexyl maleate, monooctyl maleate, and mono2-ethylhexyl maleate), monoalkyl ester itaconate (for example, monomethyl itaconate, monoethylitaconate, monobutyl itaconate, monoisobutyl itaconate, monohexyl itaconate, monooctylitaconate, and mono 2-ethylhexyl itaconate), and the like.

Examples of the vinyl monomer including a hydroxyl group as the thermosetting reaction group include various hydroxyl group-containing (meth)acrylates (for example, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate), an addition reaction product of the various hydroxyl group-containing (meth)acrylates and ε-caprolactone, various hydroxyl group-containing vinyl ethers (for example, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), an addition reaction product of the various hydroxyl group-containing vinyl ethers and ε-caprolactone, various hydroxyl group-containing allyl ethers (for example, 2-hydroxyethyl (meth)allyl ether, 3-hydroxypropyl (meth) allylether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether), an addition reaction product of the various hydroxyl group-containing allyl ethers and ε-caprolactone, and the like.

In the thermosetting (meth)acrylic resin, another vinyl monomer not including a thermosetting reaction group may be copolymerized, in addition to the (meth)acrylic monomer.

Examples of the other vinyl monomer include various α-olefins (for example, ethylene, propylene, and butene-1), various halogenated olefins except fluoroolefin (for example, vinyl chloride and vinylidene chloride), various aromatic vinyl monomers (for example, styrene, α-methyl styrene, and vinyl toluene), various diesters of unsaturated dicarboxylic acid and monohydric alcohol having 1 to 18 carbon atoms (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various acid anhydride group-containing monomers (for example, maleic anhydride, itaconic anhydride, citraconic anhydride, (meth)acrylic anhydride, and tetrahydrophthalic anhydride), various phosphoric acid ester group-containing monomers (for example, diethyl-2-(meth) acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various hydrolyzable silyl group-containing monomers (for example, γ-(meth)acryloyloxypropyl trimethoxysilane, γ-(meth)acryloyloxypropyl triethoxysilane, and γ-(meth) acryloyloxypropyl methyldimethoxysilane), various vinyl aliphatic carboxylate (for example, vinyl acetate, vinyl propionate, vinyl butyrate, vinyl isobutyrate, vinyl caproate, vinyl caprylate, vinyl caprate, vinyl laurate, branched vinyl aliphatic carboxylate having 9 to 11 carbon atoms, and vinyl stearate), various vinyl ester of carboxylic acid having a cyclic structure (for example, vinyl cyclohexane carboxylate, vinyl methylcyclohexane carboxylate, vinyl benzoate, and p-tert-butyl vinyl benzoate), and the like.

In the thermosetting (meth)acrylic resin, in the case of using a vinyl monomer other than the (meth)acrylic monomer, as the vinyl monomer including a thermosetting reaction group, a (meth)acrylic monomer not including a thermosetting reaction group is used.

Examples of the (meth)acrylic monomer not including a thermosetting reaction group include alkyl ester (meth) acrylate (for example, methyl (meth)acrylate, ethyl (meth) acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, cyclohexyl (meth) acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth)acrylate, lauryl (meth)acrylate, and stearyl (meth)acrylate), various aryl ester (meth)acrylates (for example, benzyl (meth)acrylate, phenyl (meth)acrylate, and phenoxyethyl (meth)acrylate) various alkyl carbitol (meth)acrylates (for example, ethyl carbitol (meth)acrylate), other various ester (meth)acrylates (for example, isobornyl (meth)acrylate, dicyclopentanyl (meth)acrylate, dicyclopentenyl (meth)acrylate, dicyclopentenyloxyethyl (meth)acrylate, and tetrahydrofurfuryl (meth) acrylate), various amino group-containing amide unsaturated monomers (for example, N-dimethylaminoethyl (meth)acrylamide, N-diethylaminoethyl (meth)acrylamide, N-dimethylaminopropyl (meth)acrylamide, and N-diethylamino propyl (meth)acrylamide), various dialkylaminoalkyl (meth)acrylates (for example, dimethyl amino ethyl (meth) acrylate and diethylaminoethyl (meth)acrylate), various amino group-containing monomers (for example, tert-butylaminoethyl (meth)acrylate, tert-butylaminopropyl (meth) acrylate, aziridinylethyl (meth)acrylate, pyrrolidinylethyl (meth)acrylate, and piperidinylethyl (meth)acrylate), and the like.

A number average molecular weight of the thermosetting (meth)acrylic resin is preferably from 1,000 to 20,000 (more preferably from 1,500 to 15,000).

When the number average molecular weight thereof is in the range described above, smoothness and mechanical properties of the coating film are easily improved.

The number average molecular weight of the thermosetting (meth)acrylic resin is measured by gel permeation chromatography (GPC). The molecular weight measurement by GPC is performed with a THF solvent using GPC•HLC-8120 GPC manufactured by Tosoh Corporation as a measurement device and column TSKgel Super HM-M (15 cm) manufactured by Tosoh Corporation. The weight average molecular weight and the number average molecular weight are calculated using a calibration curve of molecular weight created with a monodisperse polystyrene standard sample from results of this measurement.

Thermosetting Polyester Resin

The thermosetting polyester resin is, for example, a polycondensate obtained by polycondensing at least polybasic acid and polyol. The introduction of the thermosetting reaction group to the thermosetting polyester resin is performed by adjusting a used amount of polybasic acid and polyol. With this adjustment, a thermosetting polyester resin including at least one of a carboxylic group and a hydroxyl group as a thermosetting reaction group is obtained.

Examples of polybasic acid include terephthalic acid, isophthalic acid, phthalic acid, methylterephthalic acid, trimellitic acid, pyromellitic acid, or anhydrides thereof; succinic acid, adipic acid, azelaic acid, sebacic acid, or anhydrides thereof; maleic acid, itaconic acid, or anhydrides thereof; fumaric acid, tetrahydrophthalic acid, methyltetrahydrophthalic acid, hexahydrophthalic acid, methylhexahydrophthalic acid, or anhydrides thereof; cyclohexane dicarboxylic acid, 2,6-naphthalene dicarboxylic acid, and the like.

Examples of polyol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-hydroxyethyl terephthalate, cyclohexanedimethanol, octanediol, diethylpropane diol, butylethylpropane diol, 2-methyl-1,3-propane diol, 2,2,4-trimethylpentane diol, hydrogenated bisphenol A, an ethylene oxide adduct of hydrogenated bisphenol A, an propylene oxide adduct of hydrogenated bisphenol A, trimethylolethane, trimethylolpropane, glycerin, pentaerythritol, tris-hydroxyethyl isocyanurate, hydroxy pivalyl hydroxy pivalate, and the like.

The thermosetting polyester resin may be obtained by polycondensing polybasic acid and a monomer other than polyol.

Examples of the other monomer include a compound including both a carboxylic group and a hydroxyl group in one molecule (for example, dimethanol propionic acid and hydroxy pivalate), a monoepoxy compound (for example, glycidyl ester of branched aliphatic carboxylic acid such as "Cardura E10 (manufactured by Shell)"), various monohydric alcohols (for example, methanol, propanol, butanol, and benzyl alcohol), various monobasic acids (for example, benzoic acid and p-tert-butyl benzoate), various fatty acids (for example, castor oil fatty acid, coconut oil fatty acid, and soybean oil fatty acid), and the like.

The structure of the thermosetting polyester resin may be a branched structure or a linear structure.

Regarding the thermosetting polyester resin, the total of an acid value and a hydroxyl value is preferably from 10 mgKOH/g to 250 mgKOH/g, and the number average molecular weight is preferably from 1,000 to 100,000.

When the total of an acid value and a hydroxyl value is in the range described above, smoothness and a mechanical property of the coating film are easily improved. When the number average molecular weight is in the range described above, smoothness and a mechanical property of the coating film are improved and storage stability of the powder coating material is easily improved.

The measurement of the acid value and the hydroxyl value of the thermosetting polyester resin is performed based on JIS K-0070-1992. In addition, the measurement of the number average molecular weight of the thermosetting polyester resin is performed in the same manner as measurement of the number average molecular weight of the thermosetting (meth)acrylic resin.

The thermosetting resin may be used alone or in combination of two or more kinds thereof.

The content of the thermosetting resin is preferably 20% by weight to 99% by weight, and more preferably from 30% by weight to 95% by weight, with respect to the entirety of the powder particles.

In the case of using the thermosetting resin as the resin of the resin coating portion, the content of the thermosetting resin means content of the entire thermosetting resin in the core and the resin coating portion.

In the exemplary embodiment, a thermosetting polyester resin synthesized by using metal salt containing an aliphatic group having 5 to 20 carbon atoms, which will be described later, as a catalyst, is preferably used as the thermosetting resin. When the metal salt containing an aliphatic group having 5 to 20 carbon atoms is used as a catalyst, the metal salt containing an aliphatic group having 5 to 20 carbon atoms can be more evenly dispersed in the thermosetting polyester resin.

Thermosetting Agent

The thermosetting agent is selected depending on the kinds of the thermosetting reaction group of the thermosetting resin.

When the thermosetting reaction group of the thermosetting resin is an epoxy group, specific examples of the thermosetting agent include acid such as succinic acid, glutaric acid, adipic acid, pimelic acid, suberic acid, azelaic acid, sebacic acid, dodecanedioic acid, eicosanoic diacid, maleic acid, citraconic acid, itaconic acid, glutaconic acid, phthalic acid, tetrahydrophthalic acid, hexahydrophthalic acid, cyclohexene-1,2-dicarboxylic acid, trimellitic acid, and pyromellitic acid; anhydrides thereof; urethane-modified products thereof; and the like. Among these, as the thermosetting agent, aliphatic dibasic acid is preferably from the viewpoints of a property of the coating film and storage stability, and dodecanedioic acid is particularly preferable from the viewpoint of a property of the coating film.

When the thermosetting reaction group of the thermosetting resin is a carboxyl group, specific examples of the thermosetting agent include various epoxy resins (for example, polyglycidylether of bisphenol A), an epoxy group-containing acrylic resin (for example, glycidyl group-containing acrylic resin), various polyglycidylethers of polyol (for example, 1,6-hexanediol, trimethylol propane, and trimethylol ethane), various polyglycidylesters of polycarboxylic acid (for example, phthalic acid, terephthalic acid, isophthalic acid, hexahydrophthalic acid, methyl hexahydrophthalic acid, trimellitic acid, and pyromellitic acid), various alicyclic epoxy group-containing compounds (for example, bis(3,4-epoxy cyclohexyl) methyl adipate), hydroxy amide (for example, triglycidylisocyanurate and β-hydroxyalkyl amide), and the like.

When the thermosetting reaction group of the thermosetting resin is a hydroxyl group, examples of the thermosetting agent include blocked polyisocyanate, aminoplast, and the like. Examples of blocked polyisocyanate include organic diisocyanate such as various aliphatic diisocyanates (for example, hexamethylene diisocyanate and trimethyl hexamethylene diisocyanate), various alicyclic diisocyanates (for example, xylylene diisocyanate and isophorone diisocyanate), various aromatic diisocyanates (for example, tolylene diisocyanate and 4,4'-diphenylmethane diisocyanate); an adduct of the organic diisocyanate and polyol, a low-molecular weight polyester resin (for example, polyester polyol), or water; a polymer of the organic diisocyanate (a polymer including isocyanurate-type polyisocyanate compound); various polyisocyanate compounds blocked by a commonly used blocking agent such as isocyanate biuret product; a self-block polyisocyanate compound having a uretdione bond in a structural unit; and the like.

The thermosetting agent may be used alone or in combination of two or more kinds thereof.

The content of the thermosetting agent is preferably from 1% by weight to 30% by weight and more preferably from 3% by weight to 20% by weight, with respect to the thermosetting resin.

When the thermosetting resin is used as the resin of the resin coating portion, the content of the thermosetting agent means content of the entire thermosetting resin in the core and the resin coating portion.

Metal Salt Containing Aliphatic Group Having 5 to 20 Carbon Atoms

The metal salt containing an aliphatic group having 5 to 20 carbon atoms includes a hydrophobic portion including a long-chain aliphatic portion and a hydrophilic portion including an ionic bond with metal ions. When this compound exists in the powder, it is possible to improve affinity with the thermosetting resin in the powder due to contribution of the hydrophobic portion, and to more evenly disperse the metal salt in the powder. Meanwhile, when the hydrophilic portion including an ionic bond with metal ions exists, charging properties of the powder coating material are improved.

The metal salt containing an aliphatic group having 5 to 20 carbon atoms is more efficiently used as a catalyst when synthesizing the thermosetting resin, since the metal slat is more evenly dispersed in the resin of the compound.

The thermosetting polyester resin is used as an example of one kind of the resin which can be applied as an excellent catalyst when performing synthesis.

The number of carbon atoms of the aliphatic group of the metal slat containing an aliphatic group having 5 to 20 carbon atoms used in the exemplary embodiment, is preferably from 5 to 15 and more preferably from 7 to 12. When the number of carbon atoms of the aliphatic group is less than 5, dispersibility is not sufficient and the charge is more unevenly applied. In contrast, when the number of carbon atoms of the aliphatic group is greater than 20, a catalyst effect of an esterification reaction when performing resin synthesis starts to be decreased, and accordingly it is difficult to adjust the molecular weight and a polyester resin having a wide molecular weight distribution is obtained.

Specific examples of the aliphatic group having 5 to 20 carbon atoms include pentyl, hexyl, 2,2-dimethylpropyl, 2-ethylhexyl, heptyl, octyl, nonyl, decyl, tetradecyl, dodecyl, lauryl, stearyl, and the like.

The aliphatic group having 5 to 20 carbon atoms may include a substituent. Examples of the substituent which may be included in the aliphatic group having 5 to 20 carbon atoms include a hydroxyl group, a carboxyl group, a halogen atom, and the like.

The metal salt containing the aliphatic group having 5 to 20 carbon atoms is not particularly limited, but examples thereof include a tin compound having a structural unit derived from pentanoic acid, hexanoic acid, 2,2-dimethyl propanoic acid, 2-ethylhexanoic acid, heptanoic acid, octanoic acid, nonanoic acid, decanoic acid, tetradecanoic acid, dodecanoic acid, lauric acid, stearic acid, or oleic acid, having a structure represented as RCOO—Sn (R: aliphatic group), aliphatic titanium monocarboxylate such as titanium octanoate, aliphatic titanium dicarboxylate such as titanium sebacate, aliphatic titanium tricarboxylate such as titanium hexanetricarboxylate or titanium isooctane tricarboxylate, aliphatic titanium polycarboxylate such as titanium octane tetracarboxylate or titanium decane tetracarboxylate, and the like. Examples thereof also include aluminum compounds such as aluminum laurate or aluminum stearate. Among these, tin 2-ethylhexanoate, tin dioctanoate, and tin distearate are preferably used. In the exemplary embodiment, the metal salt containing an aliphatic group having 5 to 20 carbon atoms may be used alone or in combination of two or more kinds thereof.

In the exemplary embodiment, as the metal salt containing an aliphatic group having 5 to 20 carbon atoms, fatty acid metal salt containing an aliphatic group having 5 to 20 carbon atoms is preferable, in order to further improve coating efficiency.

In addition, in the exemplary embodiment, the metal salt containing an aliphatic group having 5 to 20 carbon atoms preferably contains Sn, in order to improve the function of the polyester resin as a synthesis catalyst.

The content of the metal salt containing an aliphatic group having 5 to 20 carbon atoms is preferably from 0.01% by weight to 2% by weight, more preferably from 0.05% by weight to 1% by weight, and even more preferably from 0.1% by weight to 0.7% by weight, with respect to the thermosetting resin described above.

The amount of the catalyst added, when the metal salt containing an aliphatic group having 5 to 20 carbon atoms is used as the synthesis catalyst of the thermosetting polyester resin, is preferably from 0.01% by weight to 2% by weight, more preferably from 0.05% by weight to 1% by weight, and even more preferably from 0.1% by weight to 0.7% by weight, with respect to the total polyester unit component amount. When the amount thereof is equal to or greater than 0.01% by weight, the reaction time when performing polyester polymerization is shortened, and evenness of the charge is improved. In addition, narrow molecular weight distribution of the polyester resin is obtained, and a coating film having excellent smoothness is easily obtained with the particles obtained as a result thereof. Meanwhile, when the amount thereof is equal to or smaller than 2% by weight, an increase in the number of ion bond portions in the coating film is prevented, moisture in the atmosphere is hardly absorbed, the coating film is hardly degraded, and the coating film maintaining property for a long time is improved.

Colorant

As a colorant, a pigment is used, for example. As the colorant, a pigment and a dye may be used in combination.

Examples of a pigment include an inorganic pigment such as iron oxide (for example, colcothar), titanium oxide, titanium yellow, zinc white, white lead, zinc sulfide, lithopone, antimony oxide, cobalt blue, and carbon black; an organic pigment such as quinacridone red, phthalocyanine blue, phthalocyanine green, permanent red, Hansa yellow, indanthrene Blue, Brilliant Fast Scarlet, and benzimidazolones yellow; and the like.

In addition, as the pigment, a photoluminescent pigment is also used. Examples of the photoluminescent pigment include metal powder such as a pearl pigment, aluminum powder, stainless steel powder; metallic flakes; glass beads; glass flakes; mica; and flake-shape iron oxide (MIO).

The colorant may be used alone or in combination of two or more kinds thereof.

The content of the colorant is determined depending on types of the pigment, and the hue, brightness, and the depth required for the coating film. The content of the colorant is, for example, preferably from 1% by weight to 70% by weight and more preferably from 2% by weight to 60% by weight, with respect to the entire resin in the core and the resin coating portion.

Other Additive

As the other additive, various additives used in the powder coating material are used. Specific examples of the other additive include a surface adjusting agent (silicone oil or acrylic oligomer), a foam inhibitor (for example, benzoin or benzoin derivatives), a hardening accelerator (an amine compound, an imidazole compound, or a cationic polymerization catalyst), a plasticizer, a charge-controlling agent, an antioxidant, a pigment dispersant, a flame retardant, a fluidity-imparting agent, and the like.

Resin Coating Portion

The resin coating portion includes a resin. The resin coating portion may be configured only of a resin, or may include other additives (the thermosetting agent described regarding the core, or other additives). However, the resin coating portion is preferably configured only of a resin, in order to further reduce the bleeding of the powder particles. Even when the resin coating portion includes the other additives, the content of the resin is preferably equal to or greater than 90% by weight (more preferably equal to or greater than 95% by weight) with respect to the entire resin coating portion.

The resin of the resin coating portion may be a non-curable resin, or may be a thermosetting resin. However, the resin of the resin coating portion is preferably a thermosetting resin, in order to improve curing density (crosslinking density) of the coating film. When the thermosetting resin is used as the resin of the resin coating portion, as this thermosetting resin, the same thermosetting resin used for the thermosetting resin of the core is used. Particularly, when the thermosetting resin is used as the resin of the resin coating portion, the thermosetting resin is preferably at least one kind selected from the group consisting of a thermosetting (meth)acrylic resin and a thermosetting polyester resin. However, the thermosetting resin of the resin coating portion may be the same kind of resin as the thermosetting resin of the core or may be a different resin.

When the non-curable resin is used as the resin of the resin coating portion, the non-curable resin is preferably at least one kind selected from the group consisting of a (meth)acrylic resin and a polyester resin.

A coverage of the resin coating portion is preferably from 30% to 100% and more preferably from 50% to 100%, in order to prevent bleeding.

The coverage of the resin coating portion with respect to the surface of the powder particle is a value acquired by X-ray photoelectron spectroscopy (XPS) measurement.

Specifically, in the XPS measurement, JPS-9000MX manufactured by JEOL Ltd. is used as a measurement device, and the measurement is performed using a MgKα ray as the X-ray source and setting an accelerating voltage to 10 kV and an emission current to 30 mA.

The coverage of the resin coating portion with respect to the surface of the powder particles is quantized by peak separation of a component derived from the material of the core on the surface of the powder particles and a component derived from a material of the resin coating portion, from the spectrum obtained under the conditions described above. In the peak separation, the measured spectrum is separated into each component using curve fitted by the least square method.

As the component spectrum to be a separation base, the spectrum obtained by singly measuring the thermosetting resin, a thermosetting agent, a pigment, an additive, metal salt containing an aliphatic group having 5 to 20 carbon atoms, a coating resin, and the like, used in preparation of the powder particle is used. In addition, the coverage is acquired from a ratio of a spectral intensity derived from the coating resin with respect to the total of entire spectral intensity obtained from the powder particles.

A thickness of the resin coating portion is preferably from 0.2 μm to 4 μm and more preferably from 0.3 μm to 3 μm, in order to prevent bleeding.

The thickness of the resin coating portion is a value obtained by the following method. The powder particle is embedded in the epoxy resin or the like, and a sliced piece is prepared by performing cutting with a diamond knife. This sliced piece is observed using a transmission electron microscope (TEM) and plural images of the cross section of the powder particles are imaged. The thicknesses of 20 portions of the resin coating portion are measured from the images of the cross section of the powder particle, and an average value thereof is used. When it is difficult to observe the resin coating portion in the image of the cross section due to a clear powder coating material, it is possible to easily perform the measurement by performing dyeing and observation.

Other Component of Powder Particle

The powder particle preferably contains di- or higher-valent metal ions (hereinafter, simply referred to as "metal ions"). When the powder particles have a structure including the core and the resin coating portion for coating the surface of the core, the metal ions are components contained in both of the core and the resin coating portion. When di- or higher-valent metal ions are contained in the powder particle, ion crosslinking is formed in the powder particle by the metal ions. For example, when the polyester resin is used as the thermosetting resin of the core and the resin of the resin coating portion, a carboxylic group or a hydroxyl group of the polyester resin reacts with the metal ions and the ion crosslinking is formed. With this ion crosslinking, the bleeding of the powder particles is prevented, and the storage property is easily improved. In addition, after coating with the powder coating material, the bond of the ion crosslinking is broken due to heating at the time of thermal curing, and accordingly, the melt viscosity of the powder particle decreases and a coating film having high smoothness is easily formed.

Examples of the metal ions include divalent to quadrivalent metal ions. Specifically, as the metal ions, for example, at least one kind of metal ion selected from the group consisting of aluminum ions, magnesium ions, iron ions, zinc ions, and calcium ions is used.

As a supply source of the metal ion (compound added to the powder particle as an additive), metal salt, an inorganic metal salt polymer, a metal complex, and the like are used, for example. For example, when preparing the powder particle by an aggregation and coalescence method, the metal salt and the inorganic metal salt polymer are added to the powder particle as an aggregating agent.

Examples of the metal salt include aluminum sulfate, aluminum chloride, magnesium chloride, magnesium sulfate, ferrous chloride (II), zinc chloride, calcium chloride, calcium sulfate, and the like.

Examples of the inorganic metal salt polymer include polyaluminum chloride, polyaluminum hydroxide, iron polysulfate (II), calcium polysulfide, and the like.

Examples of the metal complex include metal salt of an aminocarboxylic acid and the like. Specific examples of the metal complex include metal salt (for example, calcium salt, magnesium salt, iron salt, and aluminum salt) using a well known chelate as a base such as ethylenediamine tetraacetic acid, propanediamine tetraacetic acid, nitrilotriacetic acid, triethylenetetramine hexaacetic acid, diethylenetriamine pentacetic acid, and the like.

Such a supply source of the metal ions may not be used as an aggregating agent, but may be added simply as an additive.

As the valence of the metal ions is high, mesh ion crosslinking is easily formed, and it is preferable from the viewpoints of smoothness of the coating film and the storage properties of the powder coating material. Accordingly, the metal ions are preferably Al ions. That is, the supply source of the metal ions is preferably aluminum salt (for example, aluminum sulfate or aluminum chloride), or an aluminum salt polymer (for example, polyaluminum chloride or polyaluminum hydroxide). Among the supply sources of the metal ions, the inorganic metal salt polymer is preferable, compared to the metal salt, even though the valences of the metal ions thereof are the same as each other, from the viewpoints of smoothness of the coating film and the storage properties of the powder coating material. Accordingly, the supply source of the metal ions is particularly preferably an aluminum salt polymer (for example, polyaluminum chloride or polyaluminum hydroxide).

The content of the metal ions is preferably 0.002% by weight to 0.2% by weight and more preferably from 0.005% by weight to 0.15% by weight, with respect to the entire powder particle, from the viewpoints of smoothness of the coating film and the storage properties of the powder coating material.

When the content of the metal ions is equal to or greater than 0.002% by weight, suitable ion crosslinking is formed by the metal ions, bleeding of the powder particles is prevented, and the storage properties of the powder coating material are easily improved. Meanwhile, when the content of the metal ions is equal to or smaller than 0.2% by weight, the formation of excessive ion crosslinking by the metal ions is prevented, and the smoothness of the coating film is easily improved.

Herein, when preparing the powder particles by an aggregation and coalescence method, the supply source of the metal ions added as an aggregating agent (metal salt or metal salt polymer) contributes to controlling the particle size distribution and shapes of the powder particles.

Specifically, high valence of the metal ions is preferable, in order to obtain a narrow particle size distribution. In addition, in order to obtain a narrow particle size distribution, the metal salt polymer is preferable, compared to the metal salt, even though the valences of the metal ions thereof are the same as each other. Accordingly, from the viewpoints described above, the supply source of the metal ions is preferably aluminum salt (for example, aluminum sulfate or aluminum chloride) and an aluminum salt polymer (for example, polyaluminum chloride or polyaluminum hydroxide), and particularly preferably an aluminum salt polymer (for example, polyaluminum chloride or polyaluminum hydroxide).

When the aggregating agent is added so that the content of the metal ions is equal to or greater than 0.002% by weight, aggregation of the resin particles in the aqueous medium proceeds, and this contributes to realization of the narrow particle size distribution. The aggregation of the resin particles to be the resin coating portion proceeds with respect to the aggregated particles to be the core, and this contributes to realization of the formation of the resin coating portion with respect to the entire surface of the core. Meanwhile, when the aggregating agent is added so that the content of the metal ions is equal to or smaller than 0.2% by weight, excessive ion crosslinking in the aggregated particles is prevented, and the shape of the powder particles generated when performing coalescence is easily set to be close to a sphere. Accordingly, from the viewpoints described above, the content of the metal ions is preferably from 0.002% by weight to 0.2% by weight and more preferably from 0.005% by weight to 0.15% by weight.

The content of the metal ions is measured by quantitative analysis of fluorescent X-ray intensity of the powder particles. Specifically, for example, first the resin and the supply source of the metal ions are mixed with each other, and a resin mixture having a well-known concentration of the metal ions is obtained. A pellet sample is obtained with 200 mg of this resin mixture by using a tableting tool having a diameter of 13 mm. This pellet sample is precisely weighed, and the fluorescent X-ray intensity of the pellet sample is measured, to obtain peak intensity. In the same manner as described above, the measurement is performed for the pellet sample with the changed added amount of the supply source of the metal ions, and a calibration curve is created with the results. The quantitative analysis of the content of the metal ions in the powder particle to be a measurement target is performed by using this calibration curve.

Examples of an adjusting method of the content of the metal ions include 1) a method of adjusting the added amount of the supply source of the metal ions, 2) in a case of preparing the powder particles by an aggregation and coalescence method, a method of adjusting the content of the metal ions by adding the aggregating agent (for example, metal salt or the metal salt polymer) as the supply source of the metal ions in an aggregation step, adding a chelating agent (for example, ethylenediamine tetraacetic acid (EDTA), diethylenetriamine pentacetic acid (DTPA), or nitrilotriacetic acid (NTA)) at a last stage of the aggregation step, forming the metal ions and a complex by the chelating agent, and removing the formed complex salt in a washing step.

External Additive

An external additive prevents occurrence of aggregation between the powder particles. Accordingly, it is possible to form a coating film having high smoothness with a small amount thereof. Specific examples of the external additive include inorganic particles. Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$.

The volume average particle diameter of the external additive is preferably from 5 nm to 200 nm, more preferably from 7 nm to 100 nm, and even more preferably from 10 nm to 50 nm. When the external additive having a volume average particle diameter from 5 nm to 200 nm is used, when applying the powder coating material with a spray gun or the like, the powder particles are dispersed due to air flow and easily fly as primary particles, and the powder particles are attached to a material to be coated in a state of being primary particles so as to arrange (tone) the color in a unit of the particle diameter, and therefore an excellent toning property is obtained.

Surfaces of the inorganic particles as an external additive are preferably subjected to a hydrophobizing treatment. The hydrophobizing treatment is performed by, for example, dipping the inorganic particles in a hydrophobizing agent. The hydrophobizing agent is not particularly limited and examples thereof include a silane coupling agent, silicone oil, a titanate coupling agent, and an aluminum coupling agent. These may be used alone or in combination of two or more kinds thereof.

Generally, the amount of the hydrophobizing agent is, for example, from 1 part by weight to 10 parts by weight with respect to 100 parts by weight of the inorganic particles.

The amount of the external additive externally added is, for example, preferably from 0.01% by weight to 5% by weight and more preferably from 0.01% by weight to 2.0% by weight, with respect to the powder particles.

Manufacturing Method of Powder Coating Material

Next, a manufacturing method of the powder coating material according to the exemplary embodiment will be described.

After manufacturing the powder particles, the powder coating material according to the exemplary embodiment is obtained by externally adding the external additives to the powder particles, if necessary.

The powder particles may be manufactured using any of a dry manufacturing method (e.g., kneading and pulverizing method) and a wet manufacturing method (e.g., aggregation and coalescence method, suspension and polymerization method, and dissolution and suspension method). The powder particle manufacturing method is not particularly limited to these manufacturing methods, and a known manufacturing method is employed.

Among these, the powder particles are preferably obtained by an aggregation and coalescence method, in order to easily control the volume average particle size distribution index GSDv and the volume average particle diameter to be in the range described above.

Specifically, the powder particles are preferably manufactured by performing: a step of forming aggregated particles (first aggregated particles) by aggregating first particles and second particles in dispersion in which the first particles containing a thermosetting resin and having a volume average particle diameter equal to or smaller than 1 μm and the second particles containing a thermosetting agent and metal salt containing an aliphatic group having 5 to 20 carbon atoms and having a volume average particle diameter equal to or smaller than 1 µm are dispersed, or by aggregating third particles in dispersion in which the third particles containing a thermosetting resin, a thermosetting agent, and metal salt containing an aliphatic group having 5 to 20 carbon atoms and having a volume average particle diameter equal to or smaller than 1 µm are dispersed; and a step of coalescing the aggregated particles.

In addition, if necessary, a step of mixing a first aggregated particle dispersion in which the first aggregated particles are dispersed and a fourth particle dispersion in which fourth particles containing a resin are dispersed, with each other, aggregating the fourth particles on the surface of the first aggregated particles, and forming second aggregated particles with the fourth particles attached to the surface of the first aggregated particles may be provided between the step of forming the aggregated particles (first aggregated particles) and the step of coalescing the aggregated particles. In this case, the second aggregated particles are coalesced in the step of coalescing the aggregated particles.

In the powder particle manufactured by this aggregation and coalescence method, a coalesced portion of the first aggregated particles is the core, and the coalesced portion of the fourth particles attached to the surface of the first aggregated particles is the resin coating portion.

Hereinafter, the respective steps will be described in detail.

In the following description, a manufacturing method of powder particles containing a colorant will be described, but the colorant is only used if necessary. In the following description, the case of forming powder particles including a core and a resin coating portion for coating the surface of the core by coalescing the second aggregated particles in the step of coalescing the aggregated particles, will be described, however, the resin coating portion is provided, only if necessary.

Dispersion Preparation Step

First, each dispersion used in the aggregation and coalescence method is prepared. Specifically, each of the dispersion in which the first particles containing a thermosetting resin and having a volume average particle diameter equal to or smaller than 1 µm, the second particles containing a thermosetting agent and metal salt containing an aliphatic group having 5 to 20 carbon atoms and having a volume average particle diameter equal to or smaller than 1 µm, and the fourth particles containing a resin are contained respectively, and the colorant dispersion in which a colorant is dispersed, are prepared.

In addition, dispersion containing the third particles containing a thermosetting resin, a thermosetting agent, and metal salt containing an aliphatic group having 5 to 20 carbon atoms and having a volume average particle diameter equal to or smaller than 1 µm is prepared, instead of the first particle dispersion and the second particle dispersion.

In the dispersion preparation step, the first particles, the third particles, and the fourth particles are collectively described as the "resin particles". The second particle dispersion is described as "thermosetting agent dispersion".

Herein, resin particle dispersion is, for example, prepared by dispersing the resin particles in a dispersion medium with a surfactant.

An aqueous medium is used, for example, as the dispersion medium used in the resin particle dispersion.

Examples of the aqueous medium include water such as distilled water, ion exchange water, or the like, alcohols, and the like. The medium may be used alone or in combination of two or more kinds.

Examples of the surfactant include anionic surfactants such as sulfuric ester salt-based, sulfonate-based, phosphate ester-based, and soap-based anionic surfactants; cationic surfactants such as amine salt-based and quaternary ammonium salt-based cationic surfactants; and nonionic surfactants such as polyethylene glycol-based, alkyl phenol ethylene oxide adduct-based, and polyol-based nonionic surfactants. Among these, anionic surfactants and cationic surfactants are particularly used. Nonionic surfactants may be used in combination with anionic surfactants or cationic surfactants.

The surfactants may be used alone or in combination of two or more kinds thereof.

Regarding the resin particle dispersion, as a method of dispersing the resin particles in the dispersion medium, a common dispersing method using, for example, a rotary shearing-type homogenizer, or a ball mill, a sand mill, or a Dyno mill, each of which has media is exemplified. Depending on the kind of the resin particles, the resin particles may be dispersed in the resin particle dispersion using, for example, a phase inversion emulsification method.

The phase inversion emulsification method includes: dissolving a resin to be dispersed in an organic solvent in which the resin is soluble; conducting neutralization by adding a basic compound to an organic continuous phase (O phase); and converting the resin (so-called phase inversion) from W/O to O/W by adding an aqueous medium (W phase) to form a discontinuous phase, thereby dispersing the resin as particles in the aqueous medium.

Specifically, for example, in the case of manufacturing a (meth)acrylic resin particle dispersion by the manufacturing method of the resin particle dispersion, a raw material monomer is emulsified in an aqueous medium, and a water-soluble initiator, and if necessary, a chain transfer agent for controlling molecular weight are added thereto and heated to perform emulsification and polymerization, and accordingly resin particle dispersion in which the (meth)acrylic resin particles are dispersed is obtained.

In the case of manufacturing polyester resin particle dispersion, after performing heating, melting, and polycondensing under reduced pressure with respect to a raw material monomer, an organic solvent is added to and dissolved in the obtained polycondensed product, and the basic compound and a weak alkaline aqueous solution are stirred while adding those to the obtained dissolved material, and subjected to phase inversion emulsification, and accordingly, resin particle dispersion in which the polyester resin particles are dispersed is obtained.

Examples of the organic solvent which can be used in the phase inversion emulsification method include alcohols such as ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, or cyclohexanol, ketones such as methyl ethyl ketone, methyl isobutyl ketone, ethyl butyl ketone, cyclohexanone, or isophorone, ethers such as tetrahydrofuran or dioxane, esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate, or dimethyl carbonate, glycol derivatives such as ethylene glycol, ethylene glycol monomethyl ether, ethylene glycol monoethyl ether, ethylene glycol mono propyl ether, ethylene glycol monobutyl ether, ethylene glycol ethyl ether acetate, diethylene glycol, diethylene glycol monomethyl ether, diethylene glycol monoethyl ether, diethylene glycol monopropyl ether, diethylene glycol monobutyl ether, diethylene glycol ethyl ether acetate, propylene glycol, propylene glycol monomethyl ether, propylene glycol mono propyl ether, propylene glycol monobutyl ether, propylene glycol methyl ether acetate, or dipropylene glycol monobutyl ether, 3-methoxy-3-methyl butanol, 3-methoxy butanol, acetonitrile, dimethylformamide, dimethylacetamide, diacetone alcohol, ethyl acetoacetate, and the like. The above solvents can be used alone or as a mixture of two or more kinds thereof.

As the basic compounds which can be used in the phase inversion emulsification method, ammonia or an organic amine compound having a boiling point equal to or lower than 250° C. is used. Desirable examples of the organic amine compound include triethylamine, N,N-diethyl ethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylamino propylamine, sec-butylamine, propylamine, methylaminopropylamine, dimethylaminopropylamine, methyl iminobispropylamine, 3-methoxy-propylamine, monoethanolamine, diethanolamine, triethanolamine, morpholine, N-methylmorpholine, or N-ethyl morpholine.

At least the amount of the basic compound which can be partially neutralized is preferably added, according to the carboxyl group contained in the thermosetting resin. That is, the amount thereof added is preferably from 0.2 time equivalent to 9.0 times equivalent, and more preferably from 0.6 time equivalent to 2.0 times equivalent with respect to the carboxyl group. When the amount thereof is equal to or greater than 2.0 times equivalent therewith, additional effects in the basic compound and the weak alkaline aqueous solution are recognized. When the amount thereof is equal to or smaller than 9.0 times equivalent therewith, an excessive increase in O-phase hydrophilicity is prevented, sharp particle diameter distribution is obtained, and an excellent dispersion can be obtained.

In addition, in the case of obtaining the third particle dispersion, the resin and the thermosetting agent are mixed with each other, and are dispersed (for example, subjected to emulsification such as phase inversion emulsification) in a dispersion medium, and accordingly the composite particle dispersion is obtained.

The volume average particle diameter of the resin particles dispersed in the resin particle dispersion is, for example, preferably equal to or smaller than 1 μm, more preferably from 0.01 μm to 1 μm, even more preferably from 0.08 μm to 0.8 μm, and still more preferably from 0.1 μm to 0.6 μm.

Regarding the volume average particle diameter of the resin particles, a cumulative distribution by volume is drawn from the side of the smallest diameter with respect to particle size ranges (channels) separated using the particle size distribution obtained by the measurement of a laser diffraction-type particle size distribution measuring device (for example, manufactured by Horiba, Ltd., LA-700), and a particle diameter when the cumulative percentage becomes 50% with respect to the entire particles is measured as a volume average particle diameter D50v. The volume average particle diameter of the particles in other dispersions is also measured in the same manner.

The content of the resin particles contained in the resin particle dispersion is, for example, preferably from 5% by weight to 50% by weight, and more preferably from 10% by weight to 40% by weight.

For example, the thermosetting agent dispersion and the colorant dispersion are also prepared in the same manner as in the case of the resin particle dispersion. That is, the resin particles in the resin particle dispersion are the same as the particles of the colorant dispersed in the colorant dispersion and the particles of the thermosetting agent dispersed in the thermosetting agent dispersion, in terms of the volume average particle diameter, the dispersion medium, the dispersing method, and the content of the particles.

The metal salt containing an aliphatic group having 5 to 20 carbon atoms may be dispersed with the thermosetting resin in a state of being contained as a synthesis catalyst of the thermosetting resin, or may be dispersed with the thermosetting resin or the thermosetting agent in a state of being separately added to the thermosetting resin or the thermosetting agent. Accordingly, the metal salt containing an aliphatic group having 5 to 20 carbon atoms can be contained in any of the first particles to the fourth particles.

First Aggregated Particle Forming Step

Next, the first particle dispersion, the second particle dispersion, and the colorant dispersion are mixed with each other.

The first particles (thermosetting resin particles), the second particles (thermosetting agent containing the metal salt containing an aliphatic group having 5 to 20 carbon atoms), and the colorant are heterogeneously aggregated in the mixed dispersion, thereby forming first aggregated particles having a diameter near a target powder particle diameter.

Specifically, for example, an aggregating agent is added to the mixed dispersion and the pH of the mixed dispersion is adjusted so as to be acidic (for example, the pH is from 2 to 5). If necessary, a dispersion stabilizer is added. Then, the mixed dispersion is heated to the glass transition temperature of the thermosetting resin particles (specifically, for example, from a temperature 30° C. lower than the glass transition temperature of the thermosetting resin particles to a temperature 10° C. lower than the glass transition temperature) to aggregate the particles dispersed in the mixed dispersion, thereby forming the first aggregated particles.

In the first aggregated particle forming step, the first aggregated particles may be formed by mixing the third particle dispersion including the thermosetting resin, the thermosetting agent, and the metal salt containing an aliphatic group having 5 to 20 carbon atoms, and the colorant dispersion with each other and heterogeneously aggregating the third particles and the colorant in the mixed dispersion.

In the first aggregated particle forming step, for example, the aggregating agent may be added at room temperature (for example, 25° C.) while stirring of the mixed dispersion using a rotary shearing-type homogenizer, the pH of the mixed dispersion may be adjusted to be acidic (for example, the pH is from 2 to 5), a dispersion stabilizer may be added if necessary, and the heating may then be performed.

Examples of the aggregating agent include a surfactant having an opposite polarity to the polarity of the surfactant used as the dispersing agent, metal salt, a metal salt polymer, and a metal complex. When a metal complex is used as the aggregating agent, the amount of the surfactant used is reduced and charging characteristics are improved.

After completing the aggregation, an additive for forming a bond of metal ions as the aggregating agent and a complex or a similar bond may be used, if necessary. A chelating agent is suitably used as this additive. With the addition of this chelating agent, the content of the metal ions of the powder particles may be adjusted, when the aggregating agent is excessively added.

Herein, the metal salt, the metal salt polymer, or the metal complex as the aggregating agent is used as a supply source of the metal ions. These examples are as described above.

A water-soluble chelating agent is used as the chelating agent. Specific examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably from 0.01 part by weight to 5.0 parts by weight, and more preferably from 0.1 part by weight to less than 3.0 parts by weight with respect to 100 parts by weight of the resin particles.

Second Aggregated Particle Forming Step

Next, the obtained first aggregated particle dispersion in which the first aggregated particles are dispersed is mixed together with the fourth particle dispersion.

The fourth particles may be the same kind as the first particles or may be a different kind thereof.

The fourth particles are aggregated to be attached to the surface of the first aggregated particles in the mixed dispersion in which the first aggregated particles and the fourth particles are dispersed, thereby forming second aggregated particles in which the fourth particles are attached to the surface of the first aggregated particles.

Specifically, in the first aggregated particle forming step, for example, when the particle diameter of the first aggregated particles reaches a target particle diameter, the fourth particle dispersion is mixed with the first aggregated particle dispersion, and the mixed dispersion is heated at a temperature equal to or lower than the glass transition temperature of the fourth particles.

pH of the mixed dispersion is set to be in a range of 6.5 to 8.5, for example, and therefore the progress of the aggregation is stopped.

Accordingly, the second aggregated particles in which the fourth particles are aggregated to be attached to the surface of the first aggregated particles are obtained.

Coalescence Step

Next, the second aggregated particle dispersion in which the second aggregated particles are dispersed is heated at, for example, a temperature that is equal to or higher than the glass transition temperature of the first and fourth particles (for example, a temperature that is higher than the glass transition temperature of the first and fourth particles by 10° C. to 30° C.) to coalesce the second aggregated particles and form the powder particles.

The powder particles are obtained through the foregoing steps.

Herein, after the coalescence step ends, the powder particles formed in the dispersion are subjected to a washing step, a solid-liquid separation step, and a drying step, that are well known, and thus dry powder particles are obtained.

In the washing step, preferably displacement washing using ion exchange water is sufficiently performed from the viewpoint of charging properties. In addition, the solid-liquid separation step is not particularly limited, but suction filtration, pressure filtration, or the like is preferably performed from the viewpoint of productivity. The method for the drying step is also not particularly limited, but freeze drying, airflow drying, fluidized drying, vibration-type fluidized drying, or the like is preferably performed from the viewpoint of productivity.

The powder coating material according to the exemplary embodiment is manufactured by adding and mixing, for example, an external additive to the obtained dry powder particles, if necessary. The mixing is preferably performed with, for example, a V-blender, a Henschel mixer, a Lödige mixer, or the like. Furthermore, if necessary, coarse particles of the powder coating material may be removed using a vibration sieving machine, a wind classifier, or the like.

Coated Article/Manufacturing Method of Coated Article

A coated article according to the exemplary embodiment is a coated article which is coated with the powder coating material according to the exemplary embodiment. As a manufacturing method of the coated article according to the exemplary embodiment, there is a manufacturing method of the coated article of performing coating with the powder coating material according to the exemplary embodiment.

Specifically, after coating a surface to be coated with the powder coating material, a coating film having the powder coating material cured by heating (baking) is formed, and accordingly the coated article is obtained. The coating and the heating (baking) of the powder coating material may be simultaneously performed.

In the coating with the powder coating material, a well-known coating method such as electrostatic powder coating, frictional charge powder coating, or fluidized dipping is used. A thickness of the coating film of the powder coating material is, for example, preferably from 30 µm to 50 µm.

A heating temperature (baking temperature) is, for example, preferably from 90° C. to 250° C., more preferably from 100° C. to 220° C., and even more preferably from 120° C. to 200° C. The heating time (baking time) is adjusted depending on the heating temperature (baking temperature).

A target product to be coated with the powder coating material is not particularly limited, and various metal components, ceramic components, or resin components are used. These target products may be products which are not yet molded to the products such as a plate-shaped product or a linear product, and may be molded products which are molded to be used in an electronic component, a road vehicle, or an interior and exterior material of a building. In addition, the target product may be a product including a surface to be coated which is subjected to a surface treatment such as a primer treatment, a plating treatment, or an electrodeposition coating, in advance.

EXAMPLES

Hereinafter, the exemplary embodiment will be described in detail using examples, but is not limited to these examples.

Preparing Method of Coating Film Sample of Powder Coating Material

The powder coating material is applied to a square test panel of a zinc phosphate-treated steel sheet having a 10 cm×10 cm size, so as to have a coating film thickness of 30 µm to 50 µm, using a corona gun manufactured by Asahi Sumac Corporation while sliding the corona gun up, down, right, and left at a distance of 30 cm from the front surface, and baking is performed under a condition of 180° C. for 30 minutes, and a coating film sample of the powder coating material is prepared.

Measurement of Charging Amount of Attached Powder Coating Material

The charging amount of the powder at the center of the coated square test panel is measured using EA02 manufactured by UING Corporation. The absorbed powder amount is measured and the charging amount per weight (µC/g) is calculated.

Evaluation of Attachment Efficiency of Powder

After the powder coating material is applied to a square test panel of a zinc phosphate-treated steel sheet having a 30 cm×30 cm size, using a corona gun manufactured by Asahi Sunac Corporation for 3 seconds at a distance of 30 cm from the front surface, attachment efficiency is calculated based on the following equation with a difference in weight A before and after removing the powder attached to the panel and a weight of the collected powder B which is not attached thereto.

$$A/(A+B) \times 100 (\%)$$

Evaluation of Surface Smoothness of Coating Film of Powder Coating Material

A center line average roughness (hereinafter, noted as "Ra", unit: μm) of the surface of the coating film sample is measured by using a surface roughness measuring device (SURFCOM 1400A manufactured by Tokyo Seimitsu Co., Ltd.). A high value of Ra indicates low surface smoothness.

Example 1

Preparation of Acrylic Resin-Based Clear Powder Coating Material (PCA1)

Preparation of Resin Particle Dispersion (A1)
Styrene: 160 parts by weight
Methyl methacrylate: 200 parts by weight
n-butyl acrylate: 140 parts by weight
Acrylic acid: 12 parts by weight
Glycidyl methacrylate: 100 parts by weight
Dodecanethiol: 12 parts by weight A monomer solution A in which the above components are mixed and dissolved is prepared.

Meanwhile, 12 parts by weight of the anionic surfactant (Dowfax manufactured by The Dow Chemical Company) is dissolved in 280 parts by weight of ion exchange water, and the monomer solution A is added to this, and dispersed and emulsified in a flask, and accordingly a solution (monomer emulsified solution A) is obtained.

Next, 1 part by weight of the anionic surfactant (Dowfax manufactured by The Dow Chemical Company) is dissolved in 555 parts by weight of ion exchange water and is put in a flask for polymerization. After that, the flask for polymerization is tightly closed, a circulating tube is installed to introduce nitrogen, and the flask for polymerization is heated to 75° C. in a water bath while gently stirring, and held in this state.

In this state, a solution obtained by dissolving 9 parts by weight of ammonium persulfate in 43 parts by weight of ion exchange water is added dropwise into the flask for polymerization through a metering pump for 20 minutes, and then the monomer emulsified solution A is added dropwise thereto through the metering pump for 200 minutes. After completing adding, the flask for polymerization is held at 75° C. for 3 hours while continuously gently stirring to complete the polymerization, and resin particle dispersion (A1) having a solid content of 42% by weight is obtained.

Regarding the resin particles contained in the resin particle dispersion (A1), the center diameter thereof is 220 nm, the glass transition temperature is 55° C., and the weight average molecular weight is 24,000.

Preparation of Curing Agent Dispersion (D1)
Dodecanedioic acid: 50 parts by weight
Benzoin: 1 part by weight
Acrylic oligomer (Acronal 4F manufactured by BASF): 1 part by weight
Tin distearate: 2 parts by weight
Anionic surfactant (Dowfax manufactured by The Dow Chemical Company): 5 parts by weight
Ion exchange water: 200 parts by weight The above components are heated at 140° C. in a pressure vessel, and dispersed using a homogenizer (ULTRA-TURRAX T50 manufactured by IKA Ltd.), and then are subjected to dispersion treatment with a Manton-Gaulin high pressure homogenizer (manufactured by Gaulin Co., Ltd.), and accordingly curing agent dispersion (D1) (concentration of thermosetting agent: 23%) is prepared in which the curing agent having an average particle diameter of 0.24 μm and the additive are dispersed.

Preparation of Clear Powder Coating Material
Aggregation Step
Resin particle dispersion (A1): 200 parts by weight (resin: 84 parts by weight)
Curing agent dispersion (D1): 91 parts by weight (thermosetting agent: 21 parts by weight)
10% by weight polyaluminum chloride: 1 part by weight The above components are sufficiently mixed and dispersed in a round stainless steel flask using a homogenizer (ULTRA-TURRAX T50 manufactured by IKA Ltd.), and heated to 48° C. while stirring in the flask in a heating oil bath. After holding the resultant material at 48° C. for 60 minutes, 68 parts by weight of the resin particle dispersion (A1) (resin: 28.56 parts by weight) is added and gently stirred.

Coalescence Step
After that, pH in the flask is adjusted to 5.0 by 0.5 mol/liter of aqueous sodium hydroxide, and then the solution is heated to 95° C. while continuously stirring. After completing the heating of the solution in the flask to 85° C., this state is held for 4 hours. The pH when holding a temperature at 85° C. is approximately 4.0.

Filtration•Washing•Drying Step
After completing the reaction, the solution in the flask is cooled and filtered to obtain the solid content. Next, after washing this solid content with ion exchange water, solid-liquid separation is performed by Nutsche-type suction filtration, and the solid content is obtained again.

Next, this solid content is dispersed in 3 liters of ion exchange water again at 40° C., and stirred and washed at 300 rpm for 15 minutes. This washing operation is repeated 5 times, and the solid content obtained by solid-liquid separation by Nutsche-type suction filtration is subjected to vacuum drying for 12 hours, to obtain acrylic resin-based clear powder coating material particles.

When a particle diameter of the clear powder coating material particles is measured using a Coulter counter, the volume average particle diameter D50v is 6.1 μm, and the volume average particle size distribution index GSDv is 1.21. The average circularity measured using a flow type particle image analyzer "FPIA-1000" manufactured by Sysmex Corporation is 0.99.

Example 2

Preparation of Polyester Colored Powder Coating Material (PCE1)

Preparation of Colorant Dispersion (C1)
Cyan pigment (C.I. Pigment Blue 15:3, (copper phthalocyanine) manufactured by Dainichiseika Color & Chemicals Mfg. Co., Ltd.): 100 parts by weight
Anionic surfactant (NEOGEN RK manufactured by Dai-Ichi Kogyo Seiyaku Co., Ltd.): 15 parts by weight
Ion exchange water: 450 parts by weight The above components are mixed with each other and dispersed for 1 hour using a high pressure impact type dispersing machine ULTIMIZER (HJP30006 manufactured by Sugino Machine, Ltd.), and accordingly colorant dispersion (C1) in which the colorant (cyan pigment) is dispersed is prepared. An average particle diameter of the colorant (cyan pigment) in the colorant dispersion (C1) is 0.13 μm and the solid content ratio in the colorant dispersion is 25% by weight.

Preparation of White Pigment Dispersion (W1)
Titanium oxide (A-220 manufactured by Ishihara Sangyo Kaisha, Ltd.): 100 parts by weight
Anionic surfactant (NEOGEN RK manufactured by Dai-Ichi Kogyo Seiyaku Co., Ltd.): 15 parts by weight
Ion exchange water: 400 parts by weight The above components are mixed with each other and dispersed for 3 hours using a high pressure impact type dispersing machine ULTIMIZER (HJP30006 manufactured by Sugino Machine, Ltd.), and accordingly white pigment dispersion (W1) in which titanium oxide is dispersed is prepared. When performing measurement using a laser diffraction type particle size measuring device, an average particle diameter of titanium oxide pigment in the white pigment dispersion is 0.25 μm and the solid content ratio in the pigment dispersion is 25% by weight.

Preparation of Polyester Resin•Curing Agent Composite Dispersion (E1) and Polyester Resin Dispersion (E0)

Preparation of Polyester Resin (PES1)

Raw materials having the following composition are put into a reaction vessel including a stirrer, thermometer, a nitrogen gas introducing tube, and a rectifier, heated at 230° C. while stirring under a nitrogen atmosphere, and subjected to a polycondensation reaction.

Terephthalic acid: 371 parts by weight (50 mol %)
Isophthalic acid: 371 parts by weight (50 mol %)
Neopentyl glycol: 312 parts by weight (62 mol %)
Ethylene glycol: 59.4 parts by weight (20 mol %)
Glycerin: 90 parts by weight (18 mol %)
Tin dioctanoate: 0.5 part by weight Regarding the polymerized material, the glass transition temperature is 57° C., the acid value (Av) is 12 mgKOH/g, the hydroxyl value (OHv) is 55 mgKOH/g, the Mw is 24,000, and the Mn is 5,000.

Manufacturing Polyester Resin (PES2)

A polyester resin (PES2) is prepared in the same manner as the preparation of the polyester resin (PES1), except for changing 0.5 part by weight of tin dioctanoate to 0.4 part by weight of tin dihexanoate.

Regarding the polymerized material, the glass transition temperature is 57° C., the acid value (Av) is 10 mgKOH/g, the hydroxyl value (OHv) is 50 mgKOH/g, the Mw is 26,000, and the Mn is 5,500.

Manufacturing Polyester Resin (PES3)

A polyester resin (PES3) is prepared in the same manner as the preparation of the polyester resin (PES1), except for changing 0.5 part by weight of tin dioctanoate to 0.8 part by weight of tin distearate.

Regarding the polymerized material, the glass transition temperature is 56° C., the acid value (Av) is 14 mgKOH/g, the hydroxyl value (OHv) is 55 mgKOH/g, the Mw is 21,000, and the Mn is 5,000.

Manufacturing Polyester Resin (PES4)

A polyester resin (PES4) is prepared in the same manner as the preparation of the polyester resin (PES1), except for changing 0.5 part by weight of tin dioctanoate to 0.9 part by weight of dibutyl tin oxide.

Regarding the polymerized material, the glass transition temperature is 58° C., the acid value (Av) is 14 mgKOH/g, the hydroxyl value (OHv) is 45 mgKOH/g, the Mw is 26,000, and the Mn is 6,000.

Manufacturing Polyester Resin (PES5)

A polyester resin (PES5) is prepared in the same manner as the preparation of the polyester resin (PES1), except for changing 0.5 part by weight of tin dioctanoate to 0.6 part by weight of tin diacetate.

Regarding the polymerized material, the glass transition temperature is 58° C., the acid value (Av) is 15 mgKOH/g, the hydroxyl value (OHv) is 55 mgKOH/g, the Mw is 2,300, and the Mn is 5,600.

Preparation of Polyester Resin•Curing Agent Composite Dispersion (E1)

While maintaining a 3-liter jacketed reaction vessel (BJ-30N manufactured by Tokyo Rikakikai Co., Ltd.) including a capacitor, a thermometer, a water dropping device, and an anchor blade in a water circulating constant temperature vessel at 40° C., a mixed solvent of 180 parts by weight of ethyl acetate and 80 parts by weight of isopropyl alcohol is put in the reaction vessel, and the following composition is added thereto.

Polyester resin (PES1): 240 parts by weight
Blocked isocyanate curing agent VESTAGON B1530 (manufactured by Evonik Industries): 60 parts by weight
Benzoin: 3 parts by weight
Acrylic oligomer (Acronal 4F manufactured by BASF): 3 parts by weight After adding the composition, the mixture is stirred by using a three-one motor at 150 rpm and is dissolved to obtain an oil phase mixture. A mixed solution of 1 part by weight of 10% by weight ammonia aqueous solution and 47 parts by weight of 5% by weight aqueous sodium hydroxide is added dropwise to the oil phase mixture being stirred for 5 minutes and mixed therewith for 10 minutes, and 900 parts by weight of ion exchange water is further added dropwise to the mixture at a rate of 5 parts by weight per minute to perform phase inversion, and an emulsified solution is obtained.

800 parts by weight of the obtained emulsified solution and 700 parts by weight of ion exchange water are put into a 2-liter eggplant flask, and set in an evaporator (manufactured by Tokyo Rikakikai Co., Ltd.) including a vacuum control unit through a trap bump. The mixture is heated in a hot bath at 60° C. while rotating the eggplant flask, the pressure is reduced to 7 kPa while paying attention to bumping, and the solvent is removed. The pressure is returned to the normal pressure when the solvent collection amount becomes 1,100 parts by weight, the eggplant flask is water-cooled, and dispersion is obtained. The obtained dispersion does not have the odor of the solvent. A volume average particle diameter of the resin particles in this dispersion is 135 nm. After that, 2% by weight of an anionic surfactant (Dowfax2A1 manufactured by The Dow Chemical Company, 45% by weight of the active ingredients) is added to and mixed with the resin in the dispersion, as an active ingredient, and the ion exchange water is added thereto to adjust the solid content concentration to 20% by weight. This is set as polyester resin•curing agent composite dispersion (E1).

Preparation of Polyester Resin Dispersion (E0)

A polyester resin dispersion (E0) formed of a resin single material is prepared under the same conditions as those in preparation of the polyester resin•curing agent composite dispersion (E1), except for setting the amount of the polyester resin (PES1) to 300 parts by weight and not adding the blocked isocyanate curing agent, benzoin, and acrylic oligomer.

Preparation of Polyester Resin•Curing Agent Composite Dispersion (E2) to (E5)

Polyester resin•curing agent composite dispersion (E2) is prepared in the same manner as in the preparation of the polyester resin•curing agent composite dispersion (E1), except for changing the polyester resin (PES1) to polyester resin (PES2). Polyester resin•curing agent composite dispersion (E3) to (E5) is prepared in the same manner as described above. The volume average particle diameter and the solid content concentration of each of the dispersions are shown in Table 1.

TABLE 1

| Dispersion | Polyester resin | Volume average particle diameter (nm) | Solid content concentration (% by weight) |
| --- | --- | --- | --- |
| E0 | PES1 | 155 | 20 |
| E1 | PES1 | 135 | 20 |
| E2 | PES2 | 130 | 20 |
| E3 | PES3 | 140 | 20 |
| E4 | PES4 | 140 | 20 |
| E5 | PES5 | 145 | 20 |

Preparation of Polyester Colored Powder Coating Material (PCE1)

Aggregation Step

Polyester resin•curing agent composite dispersion (E1): 325 parts by weight (solid content: 65 parts by weight)

Colorant dispersion (C1): 3 parts by weight (solid content: 0.75 part by weight)

White pigment dispersion (W1): 150 parts by weight (solid content: 37.5 parts by weight)

The above components are sufficiently mixed and dispersed in a round stainless steel flask using a homogenizer (ULTRA-TURRAX T50 manufactured by IKA Ltd.). Then, the pH is adjusted to 3.5 by using 1.0% by weight nitric acid aqueous solution. 0.50 part by weight of 10% by weight polyaluminum chloride aqueous solution is added thereto, and the dispersion operation is continued with ULTRA-TURRAX.

A stirrer and a mantle heater are installed, the temperature is increased to 50° C. while appropriately adjusting the rotation rate of the stirrer so that the slurry is sufficiently stirred, and this state is held for 15 minutes at 50° C. Then, when a volume average particle diameter thereof reaches 5.5 µm when measuring the particle diameter using a Coulter counter "TA-II" (manufactured by Beckman Coulter, Inc., aperture diameter: 50 µm), 100 parts by weight of the polyester resin dispersion (E0) is slowly added as a shell.

Coalescence Step

After adding the dispersion, the resultant material is held for 30 minutes. Then, the pH is adjusted to 6.0 using 5% by weight aqueous sodium hydroxide. After that, the resultant material is heated to 85° C., and held for 2 hours.

Filtration•Washing•Drying Step

After completing the reaction, the solution in the flask is cooled and filtered to obtain the solid content. Next, after sufficiently washing this solid content with ion exchange water, solid-liquid separation is performed by Nutsche-type suction filtration, and the solid content is obtained again.

Next, this solid content is dispersed in 3 liters of ion exchange water again at 40° C., and stirred and washed at 300 rpm for 15 minutes. This washing operation is repeated 5 times, and the solid content obtained by solid-liquid separation by Nutsche-type suction filtration is subjected to vacuum drying for 12 hours, to obtain polyester colored powder coating material particles.

When the particle diameter of the colored powder coating material particles is measured using a Coulter counter, the volume average particle diameter D50v is 6.2 µm, and the volume average particle size distribution index GSDv is 1.24. The average circularity measured using a flow type particle image analyzer "FPIA-1000" manufactured by Sysmex Corporation is 0.96.

Example 3

Preparation of Polyester Colored Powder Coating Material (PCE2)

A polyester Colored Powder Coating Material (PCE2) is prepared in the same manner as in Example 2, except for changing the polyester resin•curing agent composite dispersion (E1) to the polyester resin•curing agent composite dispersion (E2).

Example 4

Preparation of Polyester Colored Powder Coating Material (PCE3)

A polyester Colored Powder Coating Material (PCE3) is prepared in the same manner as in Example 2, except for changing the polyester resin•curing agent composite dispersion (E1) to the polyester resin•curing agent composite dispersion (E3).

Example 5

Preparation of Polyester Colored Powder Coating Material (PCE4)

A polyester Colored Powder Coating Material (PCE4) is prepared in the same manner as in Example 3, except for not adding 100 parts by weight of the polyester resin dispersion (E0) as a shell.

Comparative Example 1

Preparation of Polyester Colored Powder Coating Material (PCE5)

A polyester Colored Powder Coating Material (PCE5) is prepared in the same manner as in Example 2, except for changing the polyester resin•curing agent composite dispersion (E1) to the polyester resin•curing agent composite dispersion (E4).

Comparative Example 2

Preparation of Polyester Colored Powder Coating Material (PCE6)

A polyester Colored Powder Coating Material (PCE6) is prepared in the same manner as in Example 2, except for changing the polyester resin•curing agent composite dispersion (E1) to the polyester resin•curing agent composite dispersion (E5).

Properties of the polyester Colored Powder Coating Materials (PCE1) to (PCE6) are shown in Table 2.

TABLE 2

| Sample ID | Polyester resin curing agent composite dispersion | Colorant dispersion | White pigment dispersion | Dispersion for shell | Volume average particle diameter (μm) | GSDv | Average circularity |
|---|---|---|---|---|---|---|---|
| PCE1 | E1 | C1 | W1 | E0 | 6.2 | 1.24 | 0.96 |
| PCE2 | E2 | C1 | W1 | E0 | 5.9 | 1.25 | 0.98 |
| PCE3 | E3 | C1 | W1 | E0 | 6.8 | 1.30 | 0.96 |
| PCE4 | E2 | C1 | W1 | — | 5.5 | 1.25 | 0.99 |
| PCE5 | E4 | C1 | W1 | E0 | 6.1 | 1.27 | 0.98 |
| PCE6 | E5 | C1 | W1 | E0 | 6.2 | 1.29 | 0.97 |

Addition of External Additive

After blending 100 parts by weight of the powder of PCA1 and 1.0 part by weight of hydrophobic silica (NY50 manufactured by Aerosil Nippon Co., Ltd.) having an average particle diameter of 30 nm using a Henschel mixer at a circumferential speed of 32 m/s for 10 minutes, coarse particles are removed using a sieve having mesh of 45 μm, and PCA1 with external addition is obtained. PCE1 to PCE6 with external addition are obtained in the same manner as described above.

Evaluation results of the samples are shown in Table 3 below.

TABLE 3

| | Sample ID | Charging amount (μC/g) | Attachment efficiency (%) | Surface roughness Ra (μ) |
|---|---|---|---|---|
| Example 1 | PCA1 with external addition | −3.8 | 82 | 0.05 |
| Example 2 | PCE1 with external addition | −8.3 | 89 | 0.06 |
| Example 3 | PGE2 with external addition | −5.4 | 85 | 0.04 |
| Example 4 | PCE3 with external addition | −6.5 | 88 | 0.05 |
| Example 5 | PCE4 with external addition | −3.0 | 80 | 0.06 |
| Com. Ex. 1 | PCE5 with external addition | −0.5 | 50 | 0.14 |
| Com. Ex. 2 | PCE6 with external addition | −0.7 | 57 | 0.11 |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thermosetting powder coating material comprising:
a thermosetting resin; a thermosetting agent; and metal salt containing an alkyl group having 5 to 20 carbon atoms; wherein
the thermosetting powder coating material contains powder particles having a core/shell structure, where the core of each of the powder particles comprises the thermosetting resin, the thermosetting agent, and the metal salt containing an alkyl group having 5 to 20carbon atoms, and
the shell of each of the powder particles comprises a resin selected from the group consisting of resin of a non-curable resin and a thermosetting resin, wherein a content of the resin in the shell is equal to or greater than 90% by weight with respect to the total weight of the shell; and
an attachment efficiency of the thermosetting powder coating material is in a range of from 85 to 89%, the attachment efficiency being calculated based on the following equation:

$$A/(A+B) \times 100(\%)$$

A and B being determined as follows: after the thermosetting powder coating material is applied to a square test panel of a zinc phosphate-treated steel sheet having a 30 cm ×30 cm size using a corona gun for 3 seconds at a distance of 30 cm from the front surface, A is a weight of the thermosetting powder coating material attached to the panel and B is a weight of the thermosetting powder coating material not attached to the panel.

2. The thermosetting powder coating material according to claim 1,
wherein the thermosetting resin contains at least one kind selected from the group consisting of a thermosetting (meth)acrylic resin and a thermosetting polyester resin.

3. The thermosetting powder coating material according to claim 2,
wherein a number average molecular weight of the thermosetting (meth)acrylic resin is from 1,000 to 20,000.

4. The thermosetting powder coating material according to claim 2,
wherein the total of an acid value and a hydroxyl value of the thermosetting polyester resin is from 10 mgKOH/g to 250 mgKOH/g, and the number average molecular weight is from 1,000 to 100,000.

5. The thermosetting powder coating material according to claim 1,
wherein the metal salt contains fatty acid metal salt containing an alkyl group having 5 to 20 carbon atoms.

6. The thermosetting powder coating material according to claim 1,
wherein the metal salt contains Sn.

7. The thermosetting powder coating material according to claim 1,
wherein a content of the metal salt is from 0.01% by weight to 2% by weight with respect to the thermosetting resin.

8. The thermosetting powder coating material according to claim 1,
wherein a volume average particle size distribution index GSDv is equal to or smaller than 1.50.

9. The thermosetting powder coating material according to claim 1,
wherein a volume average particle diameter D50v is from 1 μm to 25μm.

10. The thermosetting powder coating material according to claim 1,
wherein an average circularity is equal to or greater than 0.96.

11. The thermosetting powder coating material according to claim 1,
wherein a content of the thermosetting agent is from 1% by weight to 30% by weight, with respect to the thermosetting resin.

12. The thermosetting powder coating material according to claim 1,
wherein 1% by weight to 70% by weight of a colorant is contained with respect to the entire resin content of the core/shell structure, and the colorant is contained in the core of each of the powder particles.

13. The thermosetting powder coating material according to claim 1, wherein
the shell of each of the powder particles is a resin coating that consists of the resin selected from the group consisting of resin of a non-curable resin and a thermosetting resin, and
a coverage of the resin coating is from 30% to 100%.

14. The thermosetting powder coating material according to claim 13,
wherein a thickness of the resin coating is from 0.2 μm to 4 μm.

15. The thermosetting powder coating material according to claim 1, further comprising:
an external additive having a volume average particle diameter of 5 nm to 200 nm.

16. A coated article which is coated with the thermosetting powder coating material according to claim 1.

17. The coated article according to claim 16,
wherein a thickness of a coating film is from 30 μm to 50 μm.

18. The thermosetting powder coating material according to claim 1, wherein
a content of the resin contained in the shell of each of the powder particles is equal to or greater than 95% by weight with respect to the total weight of the shell.

19. The thermosetting powder coating material according to claim 1, wherein
the shell of each of the powder particles contains a thermosetting resin that is a different thermosetting resin from that of the core of each of the powder particles.

20. A thermosetting powder coating material comprising:
a thermosetting resin; a thermosetting agent; and metal salt containing an alkyl group having 5 to 20 carbon atoms; wherein
the thermosetting powder coating material contains powder particles having a core/shell structure, where
the core of each of the powder particles comprises the thermosetting resin, the thermosetting agent, and the metal salt containing an alkyl group having 5 to 20 carbon atoms, and
the shell of each of the powder particles consists of a resin selected from the group consisting of resin of a non-curable resin and a thermosetting resin; and
an attachment efficiency of the thermosetting powder coating material is in a range of from 85 to 89%, the attachment efficiency being calculated based on the following equation:

$$A/(A+B) \times 100 (\%)$$

A and B being determined as follows: after the thermosetting powder coating material is applied to a square test panel of a zinc phosphate-treated steel sheet having a 30 cm ×30 cm size using a corona gun for 3 seconds at a distance of 30 cm from the front surface, A is a weight of the thermosetting powder coating material attached to the panel and B is a weight of the thermosetting powder coating material not attached to the panel.

* * * * *